(12) United States Patent
Giraud et al.

(10) Patent No.: US 8,717,429 B2
(45) Date of Patent: May 6, 2014

(54) METHOD OF AUTOMATICALLY UNLOCKING AN OPENING MEMBER OF A MOTOR VEHICLE FOR A HANDS-FREE SYSTEM, AND DEVICE FOR IMPLEMENTING THE METHOD

(75) Inventors: Frederic Giraud, Creteil Cedex (FR); Eric Menard, Creteil Cedex (FR); Joel Senpauroca, Creteil Cedex (FR)

(73) Assignee: Valeo Securite Habitacle, Creteil Cedex (FR)

( * ) Notice: Subject to any disclaimer, the term of this patent is extended or adjusted under 35 U.S.C. 154(b) by 472 days.

(21) Appl. No.: 12/674,276

(22) PCT Filed: Aug. 21, 2008

(86) PCT No.: PCT/EP2008/060953
§ 371 (c)(1),
(2), (4) Date: Jun. 23, 2011

(87) PCT Pub. No.: WO2009/024602
PCT Pub. Date: Feb. 26, 2009

(65) Prior Publication Data
US 2011/0242303 A1 Oct. 6, 2011

(30) Foreign Application Priority Data
Aug. 21, 2007 (FR) ..................................... 07 05948

(51) Int. Cl.
*H04N 7/18* (2006.01)
*E05B 65/12* (2006.01)
*E05F 15/00* (2006.01)
*G06F 17/00* (2006.01)

(52) U.S. Cl.
CPC ................. *E05B 81/78* (2013.01); *E05F 15/00* (2013.01); *G06F 17/00* (2013.01)
USPC .......................................................... 348/77

(58) Field of Classification Search
USPC .......................................................... 348/77
See application file for complete search history.

(56) References Cited

U.S. PATENT DOCUMENTS 5,859,921 A * 1/1999 Suzuki .......................... 382/118
5,929,769 A 7/1999 Garnault
(Continued)

FOREIGN PATENT DOCUMENTS

DE 100 38 803 A1 2/2002
DE 101 19 267 C1 11/2002
(Continued)

OTHER PUBLICATIONS

International Search Report w/translation from PCT/EP2008/060953 datd Jan. 12, 2008 (6 pages).

*Primary Examiner* — Sath V Perungavoor
*Assistant Examiner* — Peter D Le
(74) *Attorney, Agent, or Firm* — Osha Liang LLP

(57) ABSTRACT

The invention relates to a method for automatically unlocking an opening member of a motor vehicle using a hands-free access system (4), comprising a central processing unit (5) intended to be installed inside the vehicle, a portable identification member (17), said central processing unit (5) being capable of communicating remotely by radiofrequency with the identification member (17) in order to authenticate it and, in response to the authentication of the identification member (17), of controlling the locking or unlocking of the opening member of the vehicle. The method comprises the following steps: the step of detecting the presence of an identification member (17) in a predefined perimeter around the vehicle; the step of authenticating that the identification member (17) is associated with the vehicle; and, in the case of positive authentication, the step of placing the access system in a "ready to unlock" state for all the opening members. The method further includes a step of remote optical recognition of a predetermined movement of a member of the body and, in the case of positive recognition of the movement, the opening member in front of which the movement has been performed, is unlocked. The invention also relates to a device for implementing the method.

9 Claims, 3 Drawing Sheets

(56) References Cited

U.S. PATENT DOCUMENTS

Figure 1:
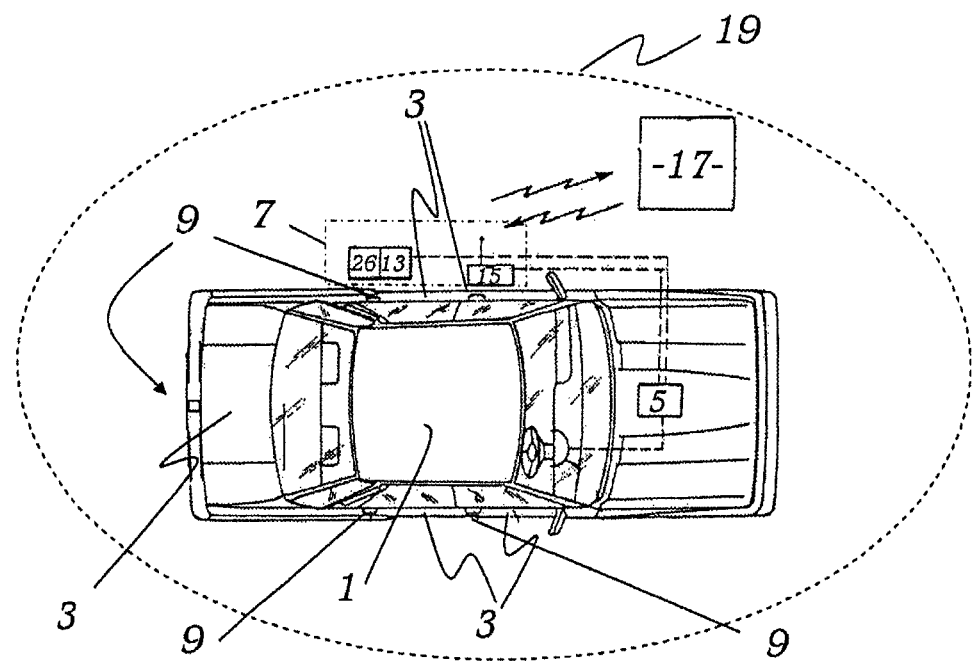

| | | | |
|---|---|---|---|
| 6,263,089 B1* | 7/2001 | Otsuka et al. | 382/107 |
| 6,993,157 B1 | 1/2006 | Oue et al. | |
| 7,137,162 B2* | 11/2006 | Spencer et al. | 14/71.5 |
| 2002/0060737 A1* | 5/2002 | Hsieh et al. | 348/208 |
| 2004/0145491 A1* | 7/2004 | Nascimento | 340/825.72 |
| 2005/0040933 A1* | 2/2005 | Huntzicker | 340/5.64 |
| 2005/0046584 A1* | 3/2005 | Breed | 340/825.72 |
| 2005/0132414 A1* | 6/2005 | Bentley et al. | 725/105 |
| 2005/0164633 A1* | 7/2005 | Linjama et al. | 455/41.2 |
| 2005/0168322 A1 | 8/2005 | Appenrodt et al. | |
| 2006/0044800 A1 | 3/2006 | Reime | |
| 2006/0059557 A1* | 3/2006 | Markham et al. | 726/22 |
| 2006/0082437 A1* | 4/2006 | Yuhara | 340/5.82 |
| 2007/0086624 A1* | 4/2007 | Breed et al. | 382/104 |
| 2007/0132552 A1* | 6/2007 | Kurpinski et al. | 340/5.72 |
| 2007/0205863 A1 | 9/2007 | Eberhard | |
| 2007/0262574 A1* | 11/2007 | Breed et al. | 280/735 |
| 2010/0275122 A1* | 10/2010 | Buxton et al. | 715/728 |

FOREIGN PATENT DOCUMENTS

| | | |
|---|---|---|
| DE | 103 61 115 A1 | 7/2005 |
| DE | 10 2004 041709 B3 | 10/2005 |
| EP | 0 770 749 A2 | 5/1997 |
| EP | 1 139 286 A1 | 10/2001 |

* cited by examiner

METHOD OF AUTOMATICALLY UNLOCKING AN OPENING MEMBER OF A MOTOR VEHICLE FOR A HANDS-FREE SYSTEM, AND DEVICE FOR IMPLEMENTING THE METHOD

The present invention relates to a method of automatically unlocking a motor vehicle opening member for a hands-free system and device for implementing the method.

In a general way, the method according to the invention applies to a vehicle equipped with a hands-free access system intended so that a user of the vehicle can enter the latter without having to operate any key or remote control.

Numerous hands-free access systems for ensuring automatic unlocking/release and opening of the opening members of the vehicle as soon as the user, carrying an identification badge, approaches the vehicle in predetermined perimeter are currently under development. In this case, the predetermined perimeter consists of an exterior space surrounding the vehicle, for example at a distance of a few meters up to possibly about ten meters. In order to cover the whole of this predetermined perimeter, a significant number of antennas is usually fitted, distributed at various places over the contour of the vehicle, so as to detect the presence of the identifier. Such antennas are for example disposed in the rearview mirrors, the door handles and the door pillars. When the identifier moves away from this predetermined perimeter, the system ensures the automatic locking of the opening members of the vehicle.

More often than not an approach sensor is coupled to the hands-free access system so that an authentication attempt is triggered solely when the approach sensor detects the presence of a user. Thus, in the case where the authentication attempt is successful, the recognition device triggers the unlocking of one or more opening members of the vehicle.

However, problems of untimely unlocking of opening members are sometimes encountered with interactive systems. The mere presence of the badge carrier in the vicinity of the vehicle suffices in fact to unlock the doors and the exchanges between the badge and the transmit/receive unit of the vehicle might order the doors to unlock without the user having wanted this or been mindful thereof.

However, if the system unlocks all the opening members of the vehicle, the risk exists of an ill-intentioned person approaching the vehicle so as for example to steal objects from the vehicle.

Moreover, patent application EP0770749 in the name of the Applicant discloses a first-generation hands-free system operating on the basis of a transponder technology.

The system described in this application allows opening/unlocking of a determined opening member without direct intervention by the hands. However, it requires the user to carry a transponder in his grasp and to present this transponder in front of receiving antennas installed for example at trunk level so as to be able to trigger the unlocking/opening of the trunk.

Thus, if a box is being carried in both hands, such an approach of the hand to the transponder antennas may turn out to be inconvenient. Furthermore, given that the exchanges between the transponder and the receiving antennas are made only over a short distance, the user must know the location of the antennas fairly precisely, which is not always the case, in particular when a rental vehicle is involved.

The present invention is aimed at proposing a method of automatically unlocking a motor vehicle opening member for hands-free system making it possible to dispense with having to present an active identifier at a precise location of the vehicle so as to trigger the unlocking of the opening member while retaining a high level of security so as to prevent any access to ill-intentioned persons.

For this purpose, the subject of the invention is a method of automatically unlocking an opening member of a motor vehicle with the aid of a hands-free access system comprising a central unit intended to be installed inside the vehicle, a portable identification item, said central unit being able to communicate by radiofrequency remotely with the identification item so as to authenticate it and, in response to the authentication of the identification item, to order the locking or the unlocking of the opening member of the vehicle, the method comprising the following steps:

detecting the presence of an identification item in a predefined perimeter around the vehicle, authenticating that the identification item is associated with the vehicle, in the case of positive authentication, placing the access system in a "ready to be unlocked" state for all the opening members, characterized in that in the case of positive authentication, a step of remote optical recognition of a predetermined gesture of a limb of the human body is undertaken, and in that in the case of positive recognition of the gesture, the opening member in front of which the gesture has been executed, is unlocked.

Also, the subject of the invention is a device for automatically unlocking an opening member of a motor vehicle for the implementation of the method such as defined above, comprising a hands-free access system comprising a central unit intended to be installed inside the vehicle, a portable identification item, said central unit being able to communicate by radiofrequency remotely with the identification item while the identification item is located in a predefined perimeter around the vehicle so as to authenticate the identification item and in response to the authentication of the identification item to order the locking or the unlocking of the opening member of the vehicle, characterized in that it furthermore comprises means of remote optical recognition of a predetermined gesture of a limb of the human body so as to unlock the opening member in front of which the gesture has been executed in the case of positive recognition of the gesture.

Figure 3:
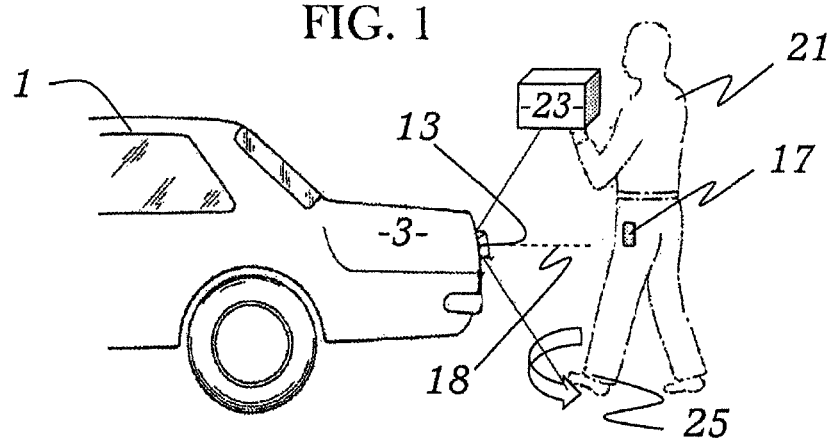
Figure 2:
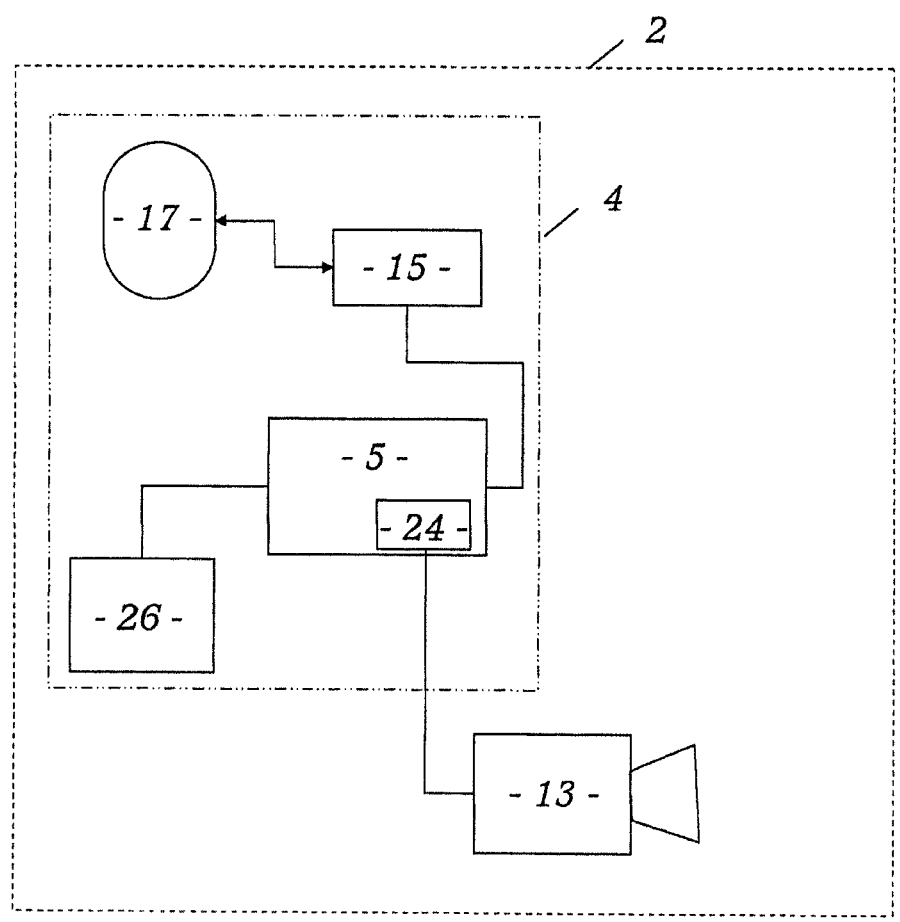
Figure 4:
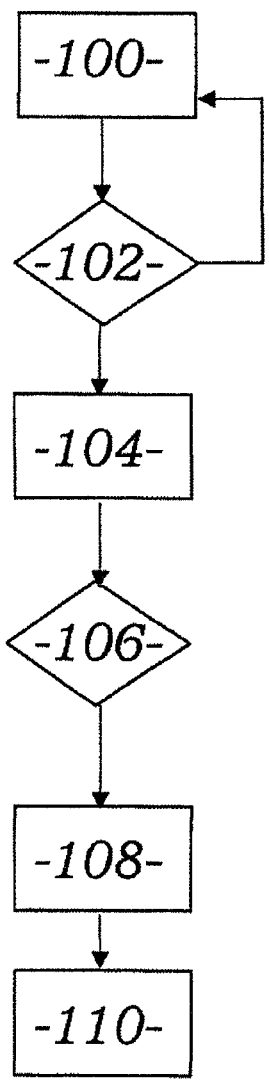

Other advantages and characteristics will become apparent on reading the description of a nonlimiting exemplary embodiment of the invention, together with appended drawings in which:

FIG. 1 is a view from above of a vehicle equipped with a device according to the invention, FIG. 2 is a schematic diagram of the device according to the invention, FIG. 3 is a side view of the vehicle of Figure with a driver wanting to open the trunk of the vehicle, and FIG. 4 is a flowchart of the method according to the invention.

An embodiment of the invention will now be described with reference to FIGS. 1 to 4. In all the figures, identical elements bear the same reference numbers.

FIG. 1 shows a motor vehicle 1 equipped with a device 2 according to the invention for automatically unlocking one or more opening members 3 of the motor vehicle.

The expression "opening member" is naturally understood to mean the side doors, pivoting or sliding, as well as the trunk or the tailgate of the vehicle.

This device 2 according to the invention comprises a hands-free access system 4 comprising a central unit 5, which system is intended to be installed inside the vehicle 1 and is linked to peripherals 7 installed for example at the level of or in each handle 9. The term "handle" is understood to mean not only the handles of the doors, but of course also that of a tailgate or trunk.

The peripherals comprise for example a camera 13 to allow the recognition of a gesture of a user, in particular the movement of a foot, preferably the rotation of a foot or the direction of rotation of a foot, and a transmitter/receiver 15 to allow remote communication with a portable identification item 17 carried by the driver of the vehicle.

According to an alternative embodiment, not represented, the use of an infrared sensor such as known in the document US2006/044800 is envisaged for tracking and recognizing a user's gestures.

Of course, the transmitters/receivers 15 can also be disposed in other places of the vehicle independently of the handles, such as for example the ceiling of the vehicle or in the pillars.

As regards the cameras 13, the latter can be black-and-white or color cameras. They are advantageously arranged in such a way that the optical axis 18 is perpendicular to the lateral or rear planes of the vehicle 1 so as to avoid any mask effect in relation to the camera when a person is facing the opening member.

The identification item 17 is for example embodied in the form of a badge and comprises means of radiocommunication with the transmitter/receiver 15 linked to the central unit 5 to allow remote radiofrequency communication with the identification item 17.

This communication serves in particular to authenticate the item 17, that is to say to verify that the item 17 is indeed associated with the vehicle 1.

Authentication is triggered when the identification item 17 is detected inside a predefined perimeter 19 around the vehicle 1.

The shape of the perimeter 19 is in the present case an ellipse, but of course, other shapes can also be envisaged.

The manner of operation of the device according to the invention will be now described and the method according to the invention will be detailed with reference more particularly to FIGS. 3 and 4.

FIG. 3 represents a driver 21 carrying an identification item 17 in a pocket and bearing an object 23 that he wants to put in the trunk 3 of the vehicle 1.

According to a first step 100 of the method, the presence of identification item 17 in the predefined perimeter 19 around the vehicle 1 is detected.

The detection of an item 17 will awaken in the central unit 5 an access computer which, during a step 102, undertakes by radiocommunication the authentication of the identification item 17 so as to verify that the latter is indeed associated with the vehicle 1.

In the case of negative authentication, step 100 is returned to so as to scan for the presence of an identification item 17 inside a perimeter 19.

In the case of positive authentication, the access system is placed in a "ready to be unlocked" state for all the opening members in step 104. The consequence of this is also to activate the cameras 13 which begin to record images. The means of remote optical recognition of a predetermined gesture of a limb of the body, in particular the camera, are therefore only activated after a positive authentication, thereby allowing optimized management of the energy of the battery of the vehicle.

Preferably, initially, by way of the cameras 13 and an image processing computer 24 in the central unit 5, the opening member in front of which the driver 21 is situated is identified.

Once the central unit 3 has determined the opening member concerned, the cameras associated with the other opening members stop recording images so as to release processing capacity for the image processing computer 24.

Alternatively, an approach sensor 26 is also placed in the handle 9 or in proximity to the latter so as to activate only the camera of the opening member 3 concerned.

In the present example, the opening member concerned 3 is the trunk (see FIG. 3).

Next, during a step 106, a predetermined gesture of a limb of the body is recognized optically by the camera 13 remotely. This step of remote optical recognition by a camera of a predetermined gesture of a limb of the body is carried out preferably start from gray-level images so as to optimize the capacity/cost pair of the image processing computer 24.

It has turned out to be judicious to be able to recognize the movement of a foot 25, in particular the rotational movement or the direction of rotation of the foot 25 of the driver 21. Indeed, the movement of a foot is discreet while being very recognizable to the camera and the image processing computer.

During a step 108, in the case of positive recognition of the gesture, the opening member 3 in front of which the gesture has been executed, is unlocked, that is to say the latch is unlocked.

If the trunk is equipped with suitable springs urging it automatically toward an open position, then the trunk opens.

In the case where the opening member 3 is equipped with a motorized assistance unit to aid the opening of the opening member (not represented), there follows a step 110 of automatic opening of the opening member 3 by way of the motorized assistance unit.

It is therefore understood that by virtue of the characteristics of the invention, the driver can access his vehicle conveniently and in a secure manner. The system is distinguished furthermore by optimized management of the energy consumption given that the device is activated successively as a function of various steps of the method.

The invention claimed is:

1. A method of automatically unlocking an opening member of a motor vehicle with the aid of a hands-free access system comprising a central unit intended to be installed inside the vehicle, a portable identification item, said central unit being able to communicate by radiofrequency remotely with the identification item so as to authenticate it and, in response to the authentication of the identification item, to order the locking or the unlocking of the opening member of the vehicle, the method comprising the following steps:
    detecting the presence of an identification item in a predefined perimeter around the vehicle;
    authenticating that the identification item is associated with the vehicle;
    in the case of positive authentication, placing the access system in a "ready to be unlocked" state for all the opening members; and
    remote optical recognition of a predetermined gesture of a limb of the body, and wherein, in the case of positive recognition of the gesture, the opening member in front of which the gesture executed, is unlocked,
    wherein the remote optical recognition comprises the recognition of a rotation movement of a foot.

2. The method as claimed in claim 1, wherein the optical recognition is carried out with the aid of a camera.

3. The method as claimed in claim 1, wherein the remote optical recognition comprises the recognition of a direction of rotation of a foot.

4. The method as claimed in claim 1, the opening member is equipped with a motorized assistance unit to aid the opening of the opening member, wherein the unlocking is followed by an automatic opening of the opening member by way of the motorized assistance unit.

5. The method as claimed in claim 2, wherein the camera, capable of remote optical recognition of a predetermined gesture of a limb of the body, is only activated after a positive authentication.

6. The method as claimed in claim 2, wherein remote optical recognition by the camera of a predetermined gesture of a limb of the body is carried out using gray-level images.

7. A device for automatically unlocking an opening member of a motor vehicle, comprising:
   a hands-free access system comprising a central unit intended to be installed inside the vehicle, a portable identification item;
      wherein said central unit is able to communicate by radiofrequency remotely with the identification item while the identification item is located in a predefined perimeter around the vehicle so as to authenticate the identification item and in response to the authentication of the identification item, place the access system in a "ready to be unlocked "state for all the opening members, and order the locking or the unlocking of the opening member of the vehicle; and
   means of remote optical recognition of a predetermined gesture of a limb of the body so as to unlock the opening member in front of which the gesture has been executed in the case of positive recognition of the gesture,
   wherein the recognition means is able to recognize a rotation movement of a foot.

8. The device as claimed in claim 7, wherein the means of remote optical recognition of a predetermined gesture comprise a camera.

9. The device as claimed in claim 7, wherein the recognition means is able to recognize a direction of rotation of a foot.

* * * * *